US009444682B2

(12) United States Patent
Linden et al.

(10) Patent No.: US 9,444,682 B2
(45) Date of Patent: *Sep. 13, 2016

(54) LOCATION-AWARE CONFIGURATION

(71) Applicant: Watchguard Technologies, Inc., Seattle, WA (US)

(72) Inventors: Thomas Linden, Los Gatos, CA (US); George Stults, Seattle, WA (US); Gerry Reams, Everett, WA (US); Gerard Cattin, Duvall, WA (US)

(73) Assignee: WATCHGUARD TECHNOLOGIES, INC., Seattle, WA (US)

( * ) Notice: Subject to any disclaimer, the term of this patent is extended or adjusted under 35 U.S.C. 154(b) by 339 days.

This patent is subject to a terminal disclaimer.

(21) Appl. No.: 14/053,485

(22) Filed: Oct. 14, 2013

(65) Prior Publication Data
US 2014/0059188 A1 Feb. 27, 2014

Related U.S. Application Data

(63) Continuation of application No. 12/694,022, filed on Jan. 26, 2010, now Pat. No. 8,560,645.

(60) Provisional application No. 61/147,542, filed on Jan. 27, 2009.

(51) Int. Cl.
*G06F 15/177* (2006.01)
*H04L 12/24* (2006.01)

(52) U.S. Cl.
CPC ....... *H04L 41/0813* (2013.01); *H04L 41/0806* (2013.01); *H04L 41/0869* (2013.01); *H04L 41/12* (2013.01)

(58) Field of Classification Search
CPC ............... H04L 41/12; H04L 41/0813; H04L 41/0806; H04L 41/0869
See application file for complete search history.

(56) References Cited

U.S. PATENT DOCUMENTS

| | | | |
|---|---|---|---|
| 5,594,947 | A | 1/1997 | Grube et al. |
| 5,781,628 | A | 7/1998 | Alperovich et al. |
| 6,470,447 | B1 | 10/2002 | Lambert et al. |
| 6,754,894 | B1 | 6/2004 | Costello et al. |
| 6,782,266 | B2 | 8/2004 | Baer et al. |
| 7,551,574 | B1 | 6/2009 | Peden, II et al. |

(Continued)

FOREIGN PATENT DOCUMENTS

WO 0059253 A1 10/2000

OTHER PUBLICATIONS

Office Action mailed Oct. 27, 2011, for U.S. Appl. No. 12/694,022.
(Continued)

*Primary Examiner* — Yves Dalencourt

(57) ABSTRACT

A networking device may operate according to a first configuration profile adapted to cause the device to conform to restrictions applicable within a plurality of different locations. The networking device may obtain a second, location-aware configuration profile, which may include restrictions applicable to the location where the device is deployed. The second, location-aware configuration profile may be provided by a location-aware configuration service responsive to a request from the device. The service may determine a location of the device from the request. The service may identify restrictions applicable within the region the device is located.

44 Claims, 3 Drawing Sheets

(56) References Cited

U.S. PATENT DOCUMENTS

| | | |
|---|---|---|
| 7,606,938 B2 | 10/2009 | Roese et al. |
| 7,792,297 B1 | 9/2010 | Piccionelli et al. |
| 8,560,645 B2 * | 10/2013 | Linden ................ H04L 41/0806 370/310.2 |
| 2005/0181808 A1 | 8/2005 | Vaudreuil |

OTHER PUBLICATIONS

Office Action mailed May 3, 2012, for U.S. Appl. No. 12/694,022.
Office Action mailed Feb. 15, 2013, for U.S. Appl. No. 12/694,022.
Notice of Allowance mailed Sep. 11, 2013, for U.S. Appl. No. 12/694,022.

* cited by examiner

LOCATION-AWARE CONFIGURATION

CROSS-REFERENCE TO RELATED APPLICATIONS

This application is a continuation of, and claims priority to, U.S. patent application Ser. No. 12/694,022, entitled "Location-Aware Configuration," filed Jan. 26, 2010 for Thomas Linden et al., which claims priority to U.S. Provisional Application No. 61/147,542, entitled, "ADAPTIVE CONFIGURATION SYSTEM TO CONFORM WIRELESS NETWORKING EQUIPMENT TO REGIONAL GOVERNMENTAL REGULATIONS," filed on Jan. 27, 2009 for Thomas Linden et al., each of which is hereby incorporated by reference in its entirety.

TECHNICAL FIELD

This disclosure relates to device configuration and, more particularly, to a location-aware configuration service.

DETAILED DESCRIPTION

Figure 1:
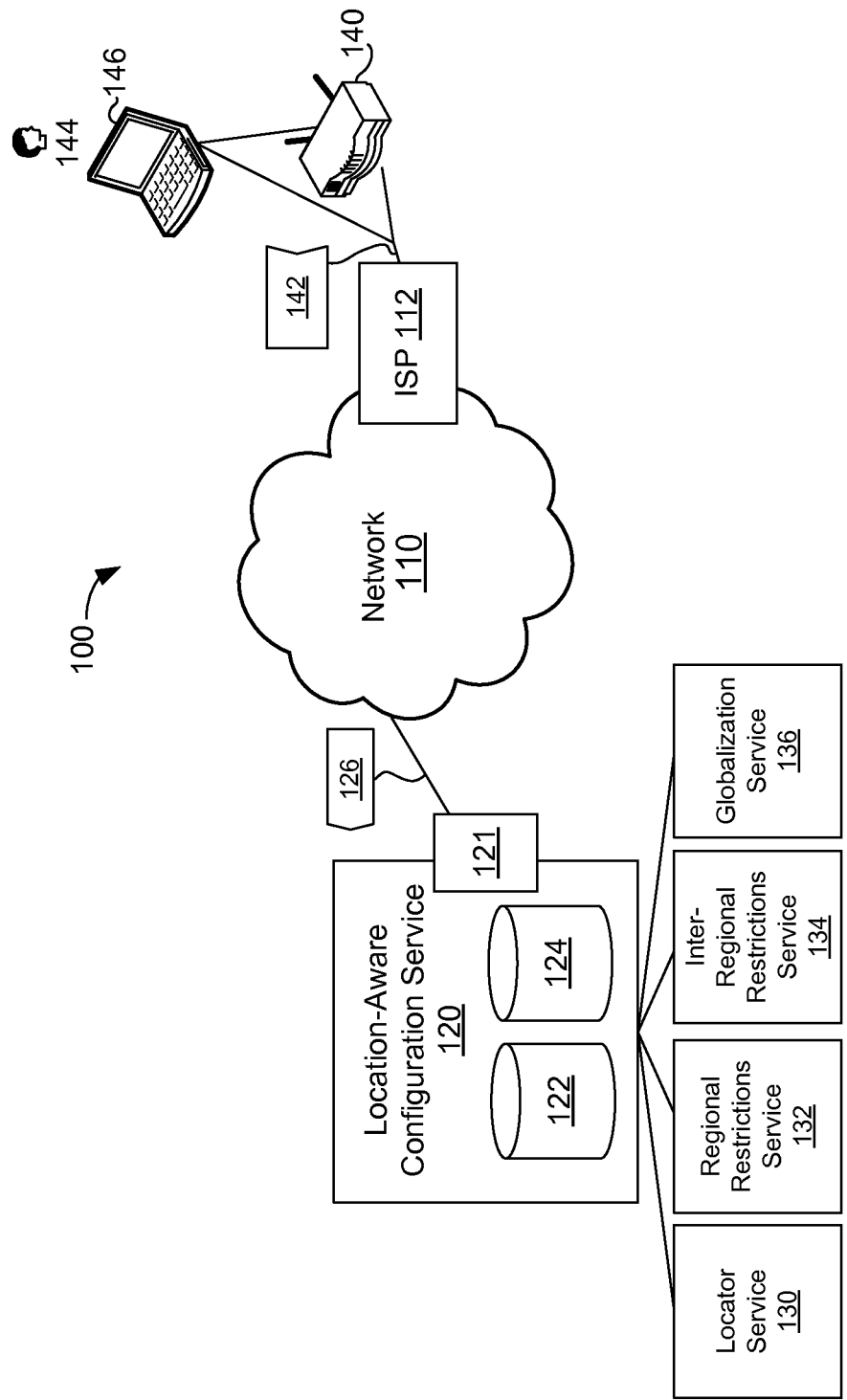
FIG. 1 is a block diagram of a system for providing a location-aware configuration profile.

A location-aware configuration service may determine the location of a networking device. The location of the networking device may be used to determine a location-aware configuration profile, which may be adapted to cause the networking device to conform to applicable device restrictions. For example, a location-aware configuration profile may be configured to cause the networking device to conform to one or more restrictions imposed by an authority within the region, by a third-party, or the like. The restrictions may determine which features may be provided by the networking device, may restrict the manner in which the features are to be provided by the device, and so on. A location-aware configuration profile may also provide localization and/or internationalization configuration data (globalization configuration), such as display language, translation information, input configuration, National Language Support (NLS), writing direction, spelling variations, and so on.

As used herein, restrictions on a networking device may include, but are not limited to: restrictions on which frequency bands a wireless device may use, restrictions on which channels are available to a device, restrictions on the operational modes that may be used by the device, restrictions on the maximum power output level of the device, notices on whether the device must accept outside interference, restrictions on the security features provided by the device (e.g., encryption algorithms, key length, digital signature types, and so on), user privacy restrictions (e.g., directives on reporting and/or logging), and so on.

A networking device may be deployed within the jurisdiction of one or more authorities, each of which may impose one or more restrictions on devices operating therein. For example, a device deployed within the United States may fall under the jurisdiction of the Federal Communications Commission (FCC), which may have authority to impose restrictions on devices operating within the borders of the United States. A device deployed in another jurisdiction (e.g., within the European Union (EU)) may fall under the jurisdiction of a different authority and, as such, may be required to conform to a different set of restrictions (e.g., the Body of European Regulators for Electronic Communications (BEREC) may impose a different set of restrictions than the FCC). Accordingly, the location-aware configuration profile of a device deployed within the United States may differ from the location-aware configuration profile of a device deployed within the EU or other country. In some cases, a region may fall under the overlapping jurisdiction of more than one authority. A location-aware configuration of a device deployed in such a region may be configured to comply with the restrictions imposed by all of the overlapping authorities, a subset of the authorities, or one selected authority.

A networking device may be subject to additional restrictions imposed by an inter-regional authority (e.g., an authority controlling the export of devices from a particular region, an international authority, or the like). For example, devices exported from the United States may be subject to restrictions imposed by the State Department, Department of Commerce, the International Trade Commission, or the like. The restrictions imposed by the export authority may depend upon the region in which the device is deployed. A location-aware configuration profile may be configured to include restrictions imposed by one or more inter-regional authorities in accordance with the location of the device.

Other location-dependent device settings may be determined in a location-aware configuration profile. For example, privacy restrictions may differ from region to region. The privacy restrictions may determine which types (if any) of user monitoring, logging, and so on, can be implemented by the networking device. Similarly, the privacy settings may determine whether user opt-in is required for logging, information gathering (e.g., marketing information), and so on. In addition, and as discussed above, a location-aware configuration profile may include globalization parameters to configure the device to use appropriate language settings, input layout, and the like.

In some embodiments, a networking device may be configured to operate according to a first configuration profile. The first configuration profile may be adapted to conform to the restrictions of a large number of jurisdictions (conform to the restrictions applicable to a plurality of different locations or countries). As such, the first configuration may provide a reduced set of features and/or functionality (e.g., reduced transmission power, frequency bands, encryption algorithms, etc.). For example, the first configuration profile may be adapted to conform to the restrictions imposed within each jurisdiction in which the device is likely to be used. Alternatively, or in addition, the first configuration may be configured to conform to all known restrictions applicable within all known regions. Where jurisdictions impose conflicting restrictions (e.g., a first jurisdiction requires the use of a particular set of wireless frequencies, whereas a second jurisdiction requires the use of a different set of frequencies), the first configuration may be adapted to disable the feature(s) giving rise to the conflict. Alternatively, the first configuration may be adapted to conform to the restriction corresponding to the location where the device is most likely to be located, conform to the restriction having the higher penalty for a violation, or the like. In some embodiments, the first configuration may include one or more restrictions imposed by an export authority, may define default globalization parameters (e.g., language, character layout, etc.), and so on.

The networking device may operate according to the first configuration profile until a location-aware configuration profile for the device is obtained (or the first configuration is overridden in another way). In some embodiments, the networking device may be configured to contact a location-aware configuration service using a communications network, such as a Public Switched Telephone Network (PSTN), TCP/IP network (e.g., the internet), a Local Area Network (LAN), Wide Area Network (WAN), combination or networks, or the like. The location-aware configuration service may determine a location of the networking device and, using the device location, return a second, location-aware configuration profile to the networking device. The second configuration may be location aware and, as such, may be adapted to cause the device to conform to one or more regional restrictions, use appropriate globalization and privacy settings, and so on. Alternatively, if the networking device cannot communicate with a location-aware configuration service, a request for an appropriate configuration profile may be submitted in another way (e.g., out-of-band, using a different computing device, via mail, or the like). An out-of-band request may include a device identifier, specify the location of the device, and the like. Responsive to the request, an appropriate configuration may be provided. In some embodiments, the configuration may be provided only after verifying the information in the request (e.g., verifying that the networking device is actually deployed in the claimed location). In some embodiments, the verification may be performed by verifying an address of a user of the device. For instance, the billing address of the device buyer may be compared against the claimed device location. Similarly, if the device buyer subscribes to a service (e.g., a service providing security updates and/or security configuration to the device), the billing address of the subscriber may be used to verify the device location. Alternatively, or in addition, an out-of-band verification may be performed (e.g., by calling the device location, mailing correspondence to the claimed location, or the like).

The device may be configured to periodically update the second configuration profile (e.g., in response to a change in the restrictions that are applicable to the device). The updates may be initiated by the device and/or may be "pushed" to the device from a location-aware configuration service. In some embodiments, a device may be configured to retransmit the second configuration profile to other devices. The retransmission may cause other devices in the vicinity of the device to comply with applicable restrictions. In some embodiments, the second configuration profile may be updated responsive to a recall, or other event. In a recall example, the second configuration profile may disable and/or modify certain device features (e.g., features that cause a venerability, are not functioning properly, or the like). The features may be re-enabled (via an update to the second configuration profile) when appropriate (e.g., when the device is updated to remove a particular venerability).

FIG. 1 is a block diagram of a system 100 for providing a location-aware configuration. The system 100 includes a network 110, which may comprise one or more TCP/IP networks, LANs, WANs, PSTNs, and so on. A location-aware configuration service 120 may be communicatively coupled to the network 110 by one or more communications interfaces 121, which may comprise wired network interfaces (e.g., Ethernet interfaces), wireless network interfaces, or the like. The location aware configuration service 120 may be implemented as and/or in conjunction with a computing device and, as such, may include a processor (not shown), memory (not shown), input-output devices (not shown), and the like.

The location-aware configuration service 120 may comprise and/or be communicatively coupled to a configuration profile data store 122. The configuration profile data store 122 may comprise computer-readable media having stored thereon, a plurality of configuration profiles adapted for a plurality of different devices. The configuration profiles stored within the data store 122 may be configured to include one or more restrictions (e.g., wireless frequency restrictions, power restrictions, and so on). Therefore, the configuration profile information in the data store 122 may be adapted to cause a device to conform to various regional restrictions. For example, the configuration profile data store 122 may include a transmission power configuration setting, which may be adapted to cause a device to conform to a particular transmission power restriction. As discussed above, the restrictions that are applicable to a particular device may depend upon the location the device is deployed and/or the source of the device (the location where the device was manufactured and/or designed).

In some embodiments, the configuration profile data store 122 may include configuration parameters configured to cause devices of various different types (e.g., different versions, hardware revisions, calibrations, and the like) to conform to various types of restrictions. Alternatively, or in addition, the configuration profile data store 122 may include configuration profile information adapted to cause a device to implement settings configured to conform to the restrictions. As discussed above, a restriction may define the maximum transmission power of a wireless networking device. The configuration profile data store 122 may include transmission power settings configured to cause a device to conform to the maximum power restriction (e.g., include pre-calibrated setting adapted to comply with the restriction). Alternatively, or in addition, the configuration profile data store 122 may include transmission power directives to cause the device to select appropriate transmission power settings according to the hardware version and/or calibration settings of the individual device.

The location-aware configuration service 120 may further include a marketing data store 124, which may be used to maintain a record of the devices that have used the location-aware configuration service 120. In some embodiments, when a device accesses the location-aware configuration service 120, a record of the device (along with the device location) may be stored in the marketing data store 124. The record may include a device identifier (e.g., serial number, version number, device name, or the like) and location. The information may be used by a device manufacturer and/or marketer to determine where devices sold thereby are being used, to trace and/or audit a reseller channel, or the like. The marketing data store 124 may only be used to store information about a device under certain conditions (e.g., if permitted by applicable privacy restrictions and/or if permission of an owner or user of the device 140 is obtained).

The location-aware configuration service 120 may comprise and/or be communicatively coupled to a locator service 130, which may be capable of determining the physical location of devices within the network 110. The locator service 130 may be provided by a third party; for example, the location service 130 may be implemented independently of the location-aware configuration service 120, which may interact with the location service 130 using an application programming interface (API) provided thereby. Alternatively, the locator service 130 may be implemented as a component and/or module of the location aware configuration service 120.

The locator service 130 may be configured to determine the location of a device (e.g., device 140) based upon messages sent therefrom. In some embodiments, communications may be sent to the location-aware configuration service 120 on the network 110 using a communications protocol, such as Internet Protocol (IP). The communications protocol may include addressing information (e.g., IP addressing information), which may be used to determine the physical location of the sending device. The addressing information may include the IP address of the sending device, traceroute information, or the like. Alternatively, or in addition, components within the network 110, such as an Internet Service Provider (ISP) 112, routers (not shown), Domain Name Servers (DNS) (not shown), WHOIS services (not shown), or the like, may provide information about the sending device (e.g. in a traceroute request). In some embodiments, the locator service 130 may determine the physical address by performing a Domain Name Server (DNS) lookup on portions of the address (the source address, portions of the message traceroute, or the like), using country codes embedded in the DNS address, based upon an ISP associated with the address (e.g., using a DNS extension, such as the extensions described in RFC 1876, 1712, or the like), reverse DNS translation, using a address database (e.g., WHOIS, nslookup, etc.), or the like. Although a particular set of techniques for determining the physical location of a device based upon messages sent thereby are discussed herein, the disclosure is not limited in this regard and could be adapted to employ any location-determining technique and/or service known in the art.

The location-aware configuration service 120 may include and/or be communicatively coupled to a regional restrictions service 132, which may provide device restrictions based upon device location. The restrictions provided by the regional restrictions service 132 may include restrictions imposed by an authority having jurisdiction in the region where the device is located. For example, if a particular device is located in the United States, the regional restrictions service 132 may provide restrictions imposed by the FCC; if the device is deployed in the EU, the regional restrictions service 132 may provide restrictions imposed by an EU authority (e.g., the BEREC); and so on. The regional restrictions service 132 may maintain and/or track changes to the restrictions pertaining to different regions. As such, the regional restrictions service 132 may be capable of providing up-to-date regional restriction information. In some embodiments, the regional restrictions may also include privacy restrictions indicating what, if any, information about the device (e.g., usage, location, enabled features, and the like) and/or marketing data may be stored by the location-aware configuration service 120 (with or without user opt-in). The regional restrictions service 132 may be implemented as a component and/or module of the location-aware configuration service 120. Alternatively, the regional restrictions service 132 may be provided by a third party.

The location-aware configuration service 120 may include and/or be communicatively coupled to inter-regional restrictions service 134, which may provide device restrictions imposed by authorities having jurisdiction over the manufacturer and/or provider of the device. The inter-regional restrictions service 134 may provide restrictions imposed by third-party, inter-regional authorities including, but not limited to: export authorities, international authorities, state departments (e.g., U.S. State Department), treaty organizations, and the like. The inter-regional restrictions service 134 may be configured to maintain and/or track changes to the restrictions imposed by various authorities. As such, the inter-regional restrictions service 134 may be capable of providing up to date restriction information. In some embodiments, the restrictions provided by the inter-regional restrictions service 134 may include privacy restrictions indicating what, if any, information about the device (e.g., usage, location, enabled features, and the like) and/or marketing information (with or without user opt-in) may be stored by the location-aware configuration service 120. The inter-regional restrictions service 134 may be implemented as a component and/or module of the location-aware configuration service 120. Alternatively, the inter-regional restrictions service 134 may be provided by a third party.

The location-aware configuration service 120 may include and/or be communicatively coupled to a globalization data store 136, which may provide globalization parameters based upon the location of a device. As discussed above, device globalization parameters may include device language settings, input/output settings, input layout settings, and the like. The globalization service 136 may be provided by a third-party and/or may be implemented as a component and/or module of the location-aware configuration service 120.

The location-aware configuration service 120 may use the configuration profile data store 122 along with the restriction and/or globalization information provided by services 130, 132, 134, and/or 136 to generate a location-aware configuration profile for a device. For example, the location-aware configuration service 120 may determine the location of a device using the locator service 130, determine applicable device restrictions, privacy settings, and/or globalization parameters using the service(s) 132, 134, and/or 136, and generate a corresponding location-aware configuration profile comprising the restrictions, privacy settings, globalization parameters using the configuration profile data store 122. The location-aware configuration profile may be provided to the device, which may implement the profile.

A networking device 140 may be communicatively coupled to a network 110. The networking device 140 may be configured to operate according to a first configuration profile, which, as discussed above, may be adapted to cause the device 140 to conform to the restrictions imposed within a plurality of different jurisdictions and/or regions. The device may be configured to operate according to the first configuration profile until a location-aware configuration profile is obtained. As discussed above, the first configuration profile may be configured to cause the device 140 to comply with all (or as many as possible) restrictions imposed throughout the world and/or within regions the device 140 is likely to be deployed. As such, the first configuration profile may cause the device 140 to provide less functionality than the device 140 is capable of providing (e.g., transmit information at lower transmission power levels, use a restricted set of transmission modes, use less sophisticated encryption techniques, and so on).

In some embodiments, the device 140 may be configured to automatically transmit a request 142 for a location-aware configuration profile to the location-aware configuration service 120 via the network 110 (using an ISP 112 of the device). Accordingly, the device 140 may be pre-configured with the address (e.g., (Internet Protocol) IP address, Uniform Resource Identifier (URI), or the like) and/or distinguished name (DN) of the location-aware configuration service 120. The pre-configured address may be secured within the device 140 to prevent modification thereof. In some embodiments, the address may be hard-coded in an EEPROM or other read-only storage location of the device 140, the device 140 may maintain a hash code or signature of the address, or the like. Similarly, the network path and/or communications channel between the device 140 and the location-aware configuration service 120 may be secured (e.g., using a secure DNS protocol, Secure Sockets Layer (SSL), Secure Hypertext Transfer Protocol (HTTPS), or the like). The device 140 may be preconfigured with a public key certificate (or other credential) of the location-aware location service 120. The credential may be hard coded and/or secured on the device 140 as described above. The device 140 may validate that it is communicating with a valid location-aware configuration service 120 using the credential (e.g., may verify a signature on communications purportedly originating from the location-aware configuration service 120). In some embodiments, the validation may comprise a challenge-response protocol in which the device 140 and/or location-aware configuration service 120 transmit respective challenges (comprising random, "nonce" data) to one another, sign or otherwise authenticate the respective challenges, and, using the respective signatures, authenticate the identity of one another.

Alternatively, or in addition, the address may be provided by a user 144 via a configuration interface provided by the device 140, through another computing device 146, using a management system (e.g., Simple Network Management Protocol (SNMP)), or the like. Similarly, the request 142 may be transmitted responsive to a user command (e.g., as part of a device registration process or the like).

The location-aware configuration service 120 may receive the request 142 and determine a location of the device 130 using the locator service 130. Based upon the location of the device 140, the location-aware configuration service 120 may identify one or more restrictions applicable thereto (e.g., using the regional restrictions service 132 and/or inter-regional restrictions service 134). The location-aware configuration service 120 may also determine one or more globalization parameters using the globalization service 136. Privacy settings may also be determined using the services 132, 134, and/or 136.

Using the restriction, globalization, and/or privacy information, the location-aware configuration service 120 may determine a location-aware configuration profile for the device 140. The location-aware configuration profile may be determined by combining configuration profile information in the configuration profile data store 122 with the identified restrictions, privacy restrictions, and/or globalization parameters. In addition, the location-aware configuration service 120 may store a record of the request 142 in the marketing data store 124 (in accordance with the privacy restrictions discussed above). The record may include a device identifier (e.g., serial number, name, etc.) in association with a location of the device 140, device features, device configuration parameters, and the like.

The location-aware configuration profile determined by the location-aware configuration service 120 may be transmitted to the device 140 via a response message 126 via the network 110. Alternatively, the location-aware configuration profile may be transmitted to a user (e.g., user 144) for manual configuration of the device 140.

When the device 140 receives the location-aware configuration profile, the device 140 may stop operating according to its initial configuration profile (e.g., first configuration profile) and begin using the location-aware configuration profile. Before implementing the location-aware configuration profile, the device 140 may be configured to verify the authenticity and/or integrity of the configuration profile. This may prevent tampering with the location-aware configuration profile and/or prevent the device 140 from implementing a configuration profile that was not transmitted from and/or produced by the location-aware configuration service. In some embodiments, the message 126 comprising the location-aware configuration profile may be digitally signed (e.g., using an X.509 certificate) or encrypted. The device 140 may verify the signature using a public key of the location-aware configuration service 120 to verify the authenticity and integrity of the configuration profile. Alternatively, or in addition, the message 126 may be transmitted to the device 140 using a secure communications protocol, such as HTTPS, secure FTP, or the like. The communications protocol may be used by the device 140 to verify the source of the message 126 and/or to verify the integrity thereof.

In some embodiments, the device 140 may be configured to periodically contact the location-aware configuration service 120 for updates to the location-aware configuration profile. Updates may be provided responsive to changes to the restrictions applicable to the device 140, recall information, or the like. Alternatively, or in addition, the location-aware configuration service 120 may be configured to actively transmit updates to the location-aware configuration profile to the device 140 (if allowed by a user of the device 140). The updates may allow the device 140 to conform to changes to applicable regional restrictions, recalls, or the like. In some embodiments, the device 140 may be required to periodically update its location-aware configuration profile. For example, the device 140 may be required to contact the location-aware configuration service 120 at a particulate interval (e.g., once a day). If the device 140 fails to contact the service 120, the device 140 may be configured to stop operating and/or to operate in a reduced-functionality mode (e.g., use the first configuration profile).

The location-aware configuration service 120 may store a compliance record whenever a device (e.g., device 140) is configured to conform to regional restrictions. The record may be stored in the marketing data store 124 or another storage location (not shown). The compliance record may provide an indication of how many devices in a particular region have been configured to conform with the applicable restrictions. The compliance information may not include device- and/or customer-identifying information (unless permitted by privacy settings and/or a user of the device 140). The compliance information may be provided to one or more authorities to show compliance by the manufacturer of the device 140.

Figure 2:
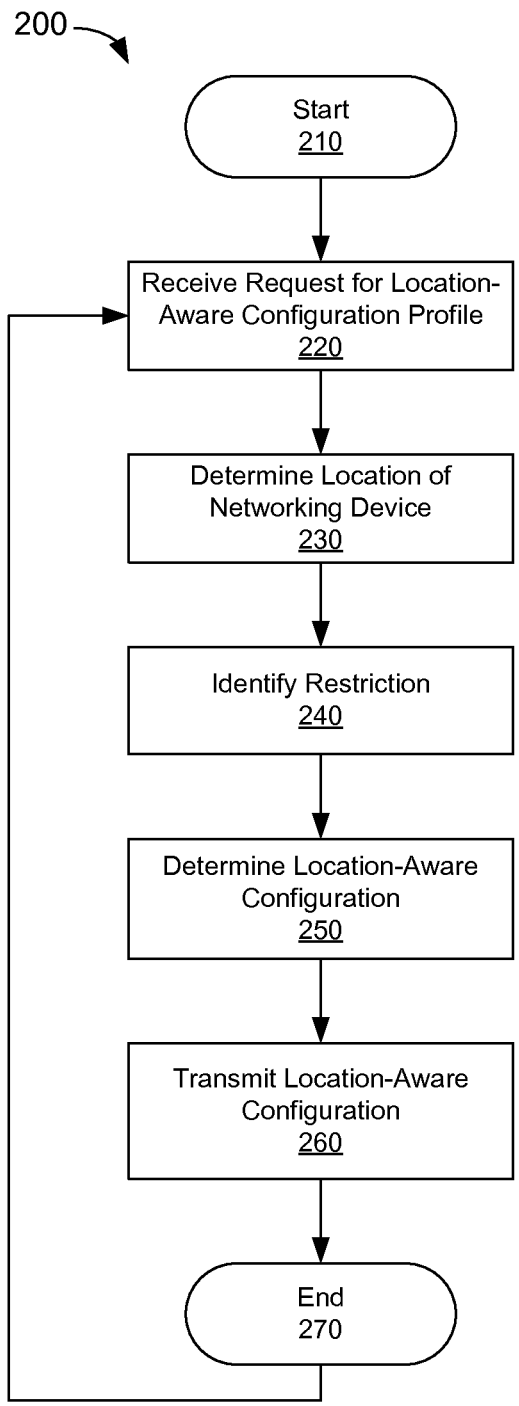
FIG. 2 is a flow diagram of a method for providing a location-aware configuration profile.

FIG. 2 is a flow diagram of one embodiment of a method 200 for providing a location-aware configuration service. The method 200 may be implemented by a computing device comprising a processor and memory using one or more computer-readable and/or computer-executable instructions. The instructions comprising the method 200 may be embodied as one or more distinct software modules, which may be stored on a computer-readable storage medium, such as a hard disc, optical storage media, or the like. In some embodiments, one or more steps of the method 200 may be tied to particular machine components, such as computer-readable storage media, communications interfaces, processing modules, or the like.

At step 210, the method 200 may start and be initialized, which may comprise the method 200 loading one or more computer-readable instructions from a computer-readable storage media, initializing communications interfaces and other resources, and the like.

At step 220, the method 200 may receive a request for a location-aware configuration from a device. The request may be received via a communications network, such as the Internet, via email, or the like and may include a device identifier (e.g., serial number, version, etc.), privacy restrictions, and the like.

At step 230, the method 200 may determine a location of the device based upon the message (e.g., based upon IP addressing information associated with the message, traceroute, etc.).

At step 240, a restriction based upon the location of the device may be identified. The identified restriction may be imposed by an authority having jurisdiction where the device is located and/or by a third party (e.g., an export authority, international authority, or the like). In some embodiments, step 240 may further include identifying one or more globalization parameters of the device (e.g., language, input layout, etc.) and/or identifying a privacy setting of the device.

At step 250, a location-aware configuration for the device may be determined. The location-aware configuration profile may include the restriction(s), globalization parameter(s), and/or privacy settings identified at step 240.

At step 260, the location-aware configuration may be transmitted to the device. In some embodiments, step 260 may comprise authenticating the location-aware configuration data by, for example, digitally signing the configuration, encrypting the configuration, or the like. Step 260 may further comprise storing a record of the request in a computer-readable storage medium. The record may include device-identifying information, such as device serial number, name, or the like, in association with a location of the device and other information (e.g., device usage information, device features, and so on). In some embodiments, the record may be stored only if permitted by the privacy settings accessed at step 240 and/or if permitted by a user of the device. A compliance record may also be stored. The compliance record may not include device- and/or customer-identifying information. As discussed above, compliance records may be used to show how many devices provided by a particular manufacturer and/or reseller have been configured to conform to the restrictions applicable within particular regions.

As discussed above, in some embodiments, steps 250 and/or 260 may further comprise verifying the location of the device. The verification may include comparing the location of the network device determined at step 230 to billing information associated with the device (e.g., a billing address of the device buyer, a billing address associated with a device subscription, and so on). Alternatively, or in addition, the verification may comprise a search of public records, ISP information, or the like. In some embodiments, if the device location cannot be verified, the location-aware configuration may be adapted to conform to both the claimed location and another likely location of the device (e.g., a identified during validation).

At step 270, the method 200 may end until another request for a location-aware configuration profile is received.

Figure 3:
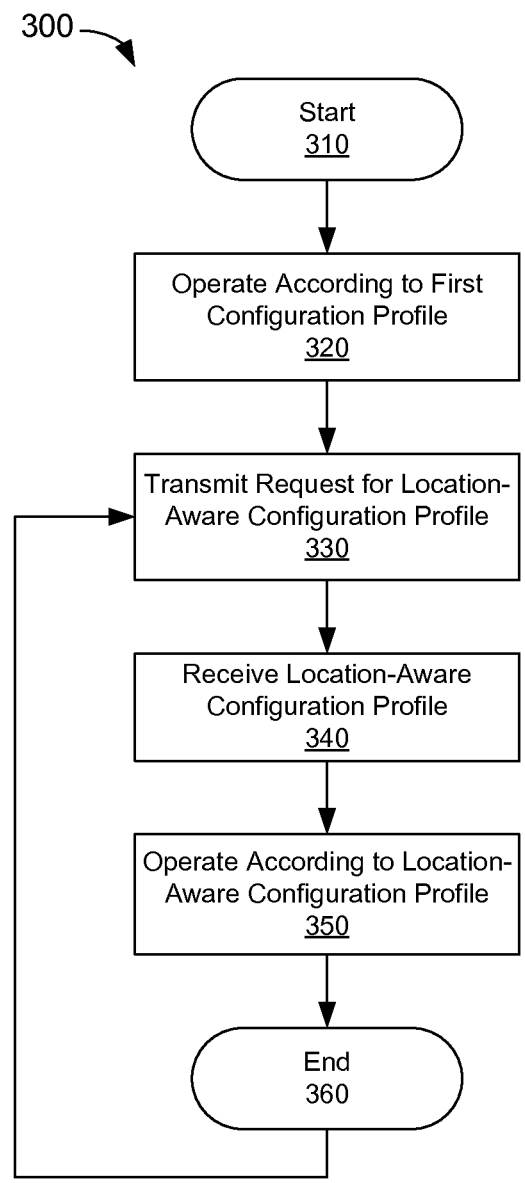
FIG. 3 is a flow diagram of a method for configuring a device to use a location-aware configuration profile.

FIG. 3 is a flow diagram of a method 300 for operating a device using a location-aware configuration profile. The method 300 may be implemented on a computing device comprising a processor and memory using one or more computer-readable and/or computer-executable instructions. The instructions comprising the method 300 may be embodied as one or more distinct software modules, which may be stored on a computer-readable storage medium, such as a hard disc, optical storage media, or the like. In some embodiments, one or more steps of the method 300 may be tied to particular machine components, such as computer-readable storage media, communications interfaces, processing modules, or the like.

At step 310, the method 300 may start and be initialized, which may comprise loading one or more computer-readable instructions from a computer-readable storage media, initializing resources for the method 300 (e.g., memory, communications interfaces, and the like), and so on.

At step 320, the device may be configured to operate according to a first configuration profile. As discussed above, the first configuration profile may be adapted to cause the device to operate in a reduced functionality mode that complies with all (or substantially all) the device restrictions applicable to devices within various regions throughout the world and/or within the locations where the device is likely to be sold and/or operated.

At step 330, the device may transmit a request for a location-aware configuration profile to a location-aware configuration service. The address of the location-aware configuration service may be included in the first configuration profile, hard coded into the device, and/or may be manually set by an operator. The request may be transmitted automatically (e.g., when the device is powered on and connected to a communications network) and/or responsive to a configuration command (e.g., from a user, an SNMP command, or the like). In some embodiments, the request may include a device identifier (e.g., serial number, name, etc.) and/or may include device privacy preferences provided by an operator or user.

At step 340, and responsive to the request, a message comprising a location-aware configuration profile may be received.

At step 350, the location-aware configuration profile received at step 340 may be implemented by the device. In some embodiments, step 350 may comprise authenticating the location-aware configuration profile and/or verifying the integrity thereof (e.g., verifying that the location-aware configuration profile has not been altered by an entity other than the location-aware configuration service). The authentication and/or verification of step 350 may comprise verifying a digital signature on the location-aware configuration profile or the like (e.g., decrypting the profile, etc.).

Implementing the location-aware configuration profile at step 350 may comprise applying one or more device settings specified therein. The settings may be configured to cause the device to conform to one or more restrictions (e.g., transmission power restriction, channel restriction, encryption algorithm restriction, or the like). Alternatively, or in addition, applying the location-aware configuration profile may comprise the device implementing settings to conform to one or more directives in the location-aware configuration profile (e.g., select settings to cause the device to conform to transmission power settings, or the like).

In some embodiments, step 350 may comprise retransmitting the applicable restrictions to other devices (e.g., using wired and/or wireless communications interface(s) of the device). The retransmission may cause other devices to conform to the restrictions applicable in the jurisdiction in which the device is deployed. In some embodiments, the restrictions may be adapted for use by other devices. For example, a transmission power restriction expressed as a device-specific setting in the location-aware configuration profile may be modified to include the actual transmission power restriction (e.g., expressed in terms of watts, decibels, or the like) and/or to provide the restriction information as settings for another type of networking device.

At step 360, the method 300 may end until an update to the location-aware configuration profile is requested.

The above description provides numerous specific details for a thorough understanding of the embodiments described herein. However, those of skill in the art will recognize that one or more of the specific details may be omitted, or other methods, components, or materials may be used. In some cases, operations are not shown or described in detail.

Furthermore, the described features, operations, or characteristics may be combined in any suitable manner in one or more embodiments. It will also be readily understood that the order of the steps or actions of the methods described in connection with the embodiments disclosed may be changed as would be apparent to those skilled in the art. Thus, any order in the drawings or Detailed Description is for illustrative purposes only and is not meant to imply a required order, unless specified to require an order.

Embodiments may include various steps, which may be embodied in machine-executable instructions to be executed by a general-purpose or special-purpose computer (or other electronic device). Alternatively, the steps may be performed by hardware components that include specific logic for performing the steps, or by a combination of hardware, software, and/or firmware.

Embodiments may also be provided as a computer program product including a computer-readable medium having stored instructions thereon that may be used to program a computer (or other electronic device) to perform processes described herein. The computer-readable medium may include, but is not limited to: hard drives, floppy diskettes, optical disks, CD-ROMs, DVD-ROMs, ROMs, RAMs, EPROMs, EEPROMs, magnetic or optical cards, solid-state memory devices, or other types of media/machine-readable medium suitable for storing electronic instructions.

As used herein, a software module or component may include any type of computer instruction or computer executable code located within a memory device and/or computer-readable storage medium. A software module may, for instance, comprise one or more physical or logical blocks of computer instructions, which may be organized as a routine, program, object, component, data structure, etc., that perform one or more tasks or implements particular abstract data types.

In certain embodiments, a particular software module may comprise disparate instructions stored in different locations of a memory device, which together implement the described functionality of the module. Indeed, a module may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices. In addition, data being tied or rendered together in a database record may be resident in the same memory device, or across several memory devices, and may be linked together in fields of a record in a database across a network.

It will be understood by those having skill in the art that many changes may be made to the details of the above-described embodiments without departing from the underlying principles of the disclosure.

We claim:

1. A method, comprising:
    configuring a networking device to provide networking services to a plurality of client devices in accordance with a first profile, wherein the first profile is configured to cause the networking device to provide the networking services to the plurality of client devices in conformance with restrictions of a plurality of different jurisdictions;
    receiving a second, location-specific profile from a configuration service via a network, wherein the second, location-specific profile is configured to cause the networking device to provide the networking services to the plurality of client devices in conformance with restrictions of one of the plurality of different jurisdictions; and
    providing networking services to the plurality of client devices in accordance with the second, location-specific profile.

2. The method of claim 1, further comprising transmitting a request for the second, location-specific profile to the configuration service via the network, wherein the configuration service is configured to determine a deployment location of the networking device based on the transmitted request.

3. The method of claim 2, further comprising accessing a preconfigured addressing information of the configuration service stored on a non-volatile storage medium of the networking device.

4. The method of claim 2, further comprising authenticating the second, location-specific profile by use of a credential stored on a non-volatile storage medium of the networking device.

5. The method of claim 2, wherein the configuration service is configured to identify a jurisdiction corresponding to the deployment location of the networking device.

6. The method of claim 1, wherein the networking device is a wireless networking device, and wherein a restriction of the second, location-aware profile pertains to one or more of a frequency used by the networking device, a channel used by the networking device, a transmission power of the networking device, and a transmission mode of the networking device.

7. The method of claim 1, wherein a restriction of the second, location-specific profile pertains to an encryption algorithm used by the networking device.

8. The method of claim 1, wherein a restriction of the second, location-specific profile corresponds to a restriction imposed by a country in which the networking device is deployed.

9. The method of claim 1, wherein a restriction of the second, location-specific profile pertains to a privacy restriction pertaining to information gathered by the networking device relating to the plurality of client devices.

10. The method of claim 1, wherein a restriction of the second, location-specific profile pertains to logging user activity on the networking device.

11. The method of claim 1, wherein a restriction of the second, location-specific profile pertains to reporting user activity performed on the networking device.

12. The method of claim 1, wherein a restriction of the second, location-specific profile pertains to monitoring user activity on the networking device.

13. A non-transitory computer-readable storage medium comprising executable instructions configured to cause a computing device to perform operations, comprising:
    providing networking services to two or more client devices in conformance with restrictions of a plurality of different jurisdictions;

receiving a location-specific profile from a configuration service through a network, wherein the location-specific profile is configured to cause a networking device to provide the networking services to the client devices in conformance with restrictions corresponding to a selected one of the plurality of different jurisdictions; and providing networking services to the client devices in accordance with the location-specific profile and in conformance with the restrictions corresponding to the selected jurisdiction by use of the networking device.

14. The non-transitory computer-readable storage medium of claim 13, the operations further comprising transmitting a request for the location-specific profile by use of the network.

15. The non-transitory computer-readable storage medium of claim 14, the operations further comprising accessing an address of the configuration service stored in a storage medium.

16. The non-transitory computer-readable storage medium of claim 13, the operations further comprising authenticating the location-specific profile by use of a credential stored on a storage medium of the networking device.

17. The non-transitory computer-readable storage medium of claim 13, wherein the configuration service is configured to determine a deployment location of the networking device based on the transmitted request.

18. The non-transitory computer-readable storage medium of claim 13, wherein the networking device is a wireless networking device, and wherein a restriction corresponding to the selected jurisdiction relates to one or more of a frequency used by the networking device, a channel used by the networking device, a transmission power of the networking device, and a transmission mode of the networking device.

19. The non-transitory computer-readable storage medium of claim 13, wherein a restriction corresponding to the selected jurisdiction relates to one or more of an encryption algorithm used by the networking device and a privacy setting of the networking device.

20. The non-transitory computer-readable storage medium of claim 13, wherein a restriction corresponding to the selected jurisdiction comprises a directive pertaining to logging user activity on the networking device.

21. The non-transitory computer-readable storage medium of claim 13, wherein a restriction corresponding to the selected jurisdiction comprises a directive pertaining to reporting user activity on the networking device.

22. The non-transitory computer-readable storage medium of claim 13, wherein a restriction corresponding to the selected jurisdiction comprises a directive pertaining to monitoring user activity on the networking device.

23. The non-transitory computer-readable storage medium of claim 13, wherein a restriction corresponding to the selected jurisdiction pertains to information gathered by the networking device relating to the plurality of client devices.

24. The non-transitory computer-readable storage medium of claim 13, wherein a restriction corresponding to the selected jurisdiction comprises a restriction imposed by one of a country in which the networking device is deployed, and an international authority.

25. An apparatus, comprising:
a networking device comprising an interface to a network; and a storage medium of the networking device configured to store a first profile, wherein the networking device is configured to provide networking services to one or more client devices in accordance with the first profile, and wherein the first profile is configured to cause the networking device to provide the networking services to the client devices in conformance with restrictions of a plurality of different jurisdictions, wherein the networking device is configured to receive a second, location-aware profile via the network, wherein the second, location-aware profile is configured to cause the networking device to provide the networking services to the client devices in conformance with restrictions of a particular jurisdiction, and wherein the networking device is configured to provide networking services to the client devices in accordance with the second, location-aware profile and in conformance with the restrictions of the particular jurisdiction.

26. The apparatus of claim 25, wherein the networking device is configured to transmit a request for the second, location-aware profile to a configuration server by use of the network.

27. The apparatus of claim 26, wherein the networking device comprises a computer-readable storage medium configured to store information pertaining to the configuration server, and wherein the networking device is configured to transmit the request using the stored information.

28. The apparatus of claim 27, wherein the networking device is configured to authenticate the second, location-aware profile by use of the stored information pertaining to the configuration server.

29. The apparatus of claim 25, wherein a restriction of the particular jurisdiction corresponds to one or more of a transmission frequency of the networking device, a transmission channel of the networking device, a transmission power of the networking device, and an encryption algorithm used by the networking device.

30. The apparatus of claim 25, wherein the second, location-aware profile comprises a language parameter for the networking device, and wherein the networking device is configured to provide information to a user in accordance with the language parameter.

31. The apparatus of claim 25, wherein a restriction of the particular jurisdiction comprises a restriction that relates to logging user activity on the networking device.

32. The apparatus of claim 25, wherein a restriction of the particular jurisdiction comprises a restriction that relates to reporting user activity on the networking device.

33. The apparatus of claim 25, wherein a restriction of the particular jurisdiction comprises a restriction that relates to monitoring user activity on the networking device.

34. The apparatus of claim 25, wherein the networking device is configured to receive an updated location-aware profile corresponding to updated restrictions of the particular jurisdiction, and wherein the networking device is configured to provide networking services to the client devices in conformance with the updated restrictions.

35. A system, comprising:
a networking device configured to provide networking services to a plurality of users at a deployment location in accordance with a first set of restrictions, wherein the first set of restrictions correspond to restrictions of two or more different jurisdictions, wherein the networking device is configured to receive a location-specific configuration from a configuration service in response to a request transmitted to the configuration service by the networking device, wherein the location-specific configuration is configured to cause the networking device to provide networking services in accordance with a second, different set of restrictions corresponding to restrictions of a selected one of the two or more different jurisdictions, and wherein the networking device is configured to provide networking services to the plurality of users at the deployment location in accordance with the second, different set of restrictions corresponding to the selected jurisdiction.

36. The system of claim 35, wherein the networking device is configured to authenticate the second, location-specific profile.

37. The system of claim 35, wherein the networking device comprises a non-transitory storage medium comprising stored information pertaining to the configuration service, and wherein the networking device is configured to transmit the request by use of the stored information.

38. The system of claim 37, wherein the stored information pertaining to the configuration service comprises a network address of the configuration service.

39. The system of claim 37, wherein the stored information pertaining to the configuration service comprises a certificate of the configuration service.

40. The system of claim 37, wherein the networking device is configured to authenticate the second, location-specific profile by use of the stored information pertaining to the configuration service.

41. The system of claim 35, wherein the networking device is configured to receive an updated location-specific profile from the configuration service, the updated location-specific profile comprising a third, different set of restrictions corresponding to the selected jurisdiction, and wherein the networking device is configured to provide networking services to the plurality of users at the deployment location in accordance with the third, different set of restrictions.

42. The system of claim 35, wherein the second, different set of restrictions includes a restriction pertaining to logging user activity on the networking device.

43. The system of claim 35, wherein the second, different set of restrictions includes a restriction pertaining to reporting user activity on the networking device.

44. The system of claim 35, wherein the second, different set of restrictions includes a restriction pertaining to monitoring user activity on the networking device.

* * * * *